United States Patent
Tani

(10) Patent No.: US 11,884,059 B2
(45) Date of Patent: Jan. 30, 2024

(54) PRINTING DEVICE

(71) Applicant: SCREEN HOLDINGS CO., LTD., Kyoto (JP)

(72) Inventor: Kazuma Tani, Kyoto (JP)

(73) Assignee: SCREEN HOLDINGS CO., LTD., Kyoto (JP)

(*) Notice: Subject to any disclaimer, the term of this patent is extended or adjusted under 35 U.S.C. 154(b) by 173 days.

(21) Appl. No.: 17/630,429

(22) PCT Filed: Sep. 15, 2020

(86) PCT No.: PCT/JP2020/034964
§ 371 (c)(1),
(2) Date: Jan. 26, 2022

(87) PCT Pub. No.: WO2021/060081
PCT Pub. Date: Apr. 1, 2021

(65) Prior Publication Data
US 2022/0288950 A1    Sep. 15, 2022

(30) Foreign Application Priority Data
Sep. 27, 2019   (JP) ................................. 2019-177762

(51) Int. Cl.
*B41J 11/00* (2006.01)
*B41J 15/00* (2006.01)
(Continued)

(52) U.S. Cl.
CPC .......... *B41J 11/003* (2013.01); *B41J 11/0055* (2013.01); *B65H 20/005* (2013.01);
(Continued)

(58) Field of Classification Search
CPC .... B41J 11/003; B41J 15/046; B41J 11/0025; B65H 20/005; B65H 23/032; B65H 26/02;
(Continued)

(56) References Cited

U.S. PATENT DOCUMENTS 4,832,243 A    5/1989  Usami
2014/0209653 A1*  7/2014  Kikuchi ............. B65H 23/0204
                                                          226/15
(Continued)

FOREIGN PATENT DOCUMENTS

JP    63-180661 A    7/1988
JP    02-043861 U1   3/1990
(Continued)

OTHER PUBLICATIONS

Ishido, Machine Translation of JP-7218569-B2, 2018 (Year: 2018).*
(Continued)

*Primary Examiner* — Scott A Richmond
(74) *Attorney, Agent, or Firm* — Rimon, P.C.

(57) ABSTRACT

A printing device includes: a substrate feed-out section; a substrate transport section; a storage which stores the width size of the substrate; a skew correction section including a skew sensor which detects the skew of the substrate, and adapted to correct the skew of the substrate with reference to an output of the skew sensor and the substrate width size stored in the storage; an image recording section which performs an image recording operation on the substrate; a first sensor which detects a width size-changed portion of the substrate upstream of the skew correction section with respect to the transport direction; and a controller. Upon the detection of the width size-changed portion, the controller stops the substrate skew correction while continuously transporting the substrate. After the width size-changed portion
(Continued)

of the substrate reaches a reference position downstream of the skew correction section, the controller restarts the skew correction.

13 Claims, 8 Drawing Sheets

(51) Int. Cl.
| | |
|---|---|
| *B65H 20/00* | (2006.01) |
| *B65H 23/032* | (2006.01) |
| *B65H 26/02* | (2006.01) |
| *B65H 43/04* | (2006.01) |
| *G03G 15/00* | (2006.01) |
| *G06K 15/00* | (2006.01) |
| *G06K 15/02* | (2006.01) |
| *G06K 15/10* | (2006.01) |
| *G06K 15/16* | (2006.01) |

(52) U.S. Cl.
CPC ........... *B65H 23/032* (2013.01); *B65H 26/02* (2013.01); *B65H 43/04* (2013.01); *G03G 15/5062* (2013.01); *G06K 15/002* (2013.01); *G06K 15/022* (2013.01); *G06K 15/102* (2013.01); *G06K 15/16* (2013.01); *G06K 15/408* (2013.01); *B65H 2511/12* (2013.01); *B65H 2553/51* (2013.01)

(58) Field of Classification Search
CPC ................ B65H 43/04; B65H 2511/12; B65H 2553/51; B65H 2557/63; B65H 2801/03; B65H 23/0204; G03G 15/5062; G03G 15/607; G06K 15/002; G06K 15/022; G06K 15/102; G06K 15/16; G06K 15/408

See application file for complete search history.

(56) References Cited

U.S. PATENT DOCUMENTS

| | | |
|---|---|---|
| 2017/0275117 A1 | 9/2017 | Kajiya et al. |
| 2018/0273330 A1 | 9/2018 | Kakimoto et al. |

FOREIGN PATENT DOCUMENTS

| | | | | |
|---|---|---|---|---|
| JP | 2012-240067 A | 12/2012 | | |
| JP | 2014-189337 A | 10/2014 | | |
| JP | 2017-065875 A | 4/2017 | | |
| JP | 2017-171436 A | 9/2017 | | |
| JP | 2017-202889 A | 11/2017 | | |
| JP | 2018-043870 A | 3/2018 | | |
| JP | 2018158838 A | * | 10/2018 | ............... B65H 7/08 |
| JP | 2018-171743 A | 11/2018 | | |
| JP | 7218569 B2 | * | 2/2023 | |

OTHER PUBLICATIONS

Yamane, MachineTranslationofJP-2018158838-A, 2018 (Year: 2018).*

Transmittal of International Preliminary Report on Patentability issued on International Patent Application No. PCT/JP2020/034964, dated Apr. 7, 2022.

Notification of Transmittal of Translation of the International Preliminary Report on Patentability issued on International Patent Application No. PCT/JP2020/034964, dated Apr. 7, 2022.

International Search Report issued in corresponding International Patent Application No. PCT/JP2020/034964, dated Nov. 17, 2020, with English translation.

* cited by examiner

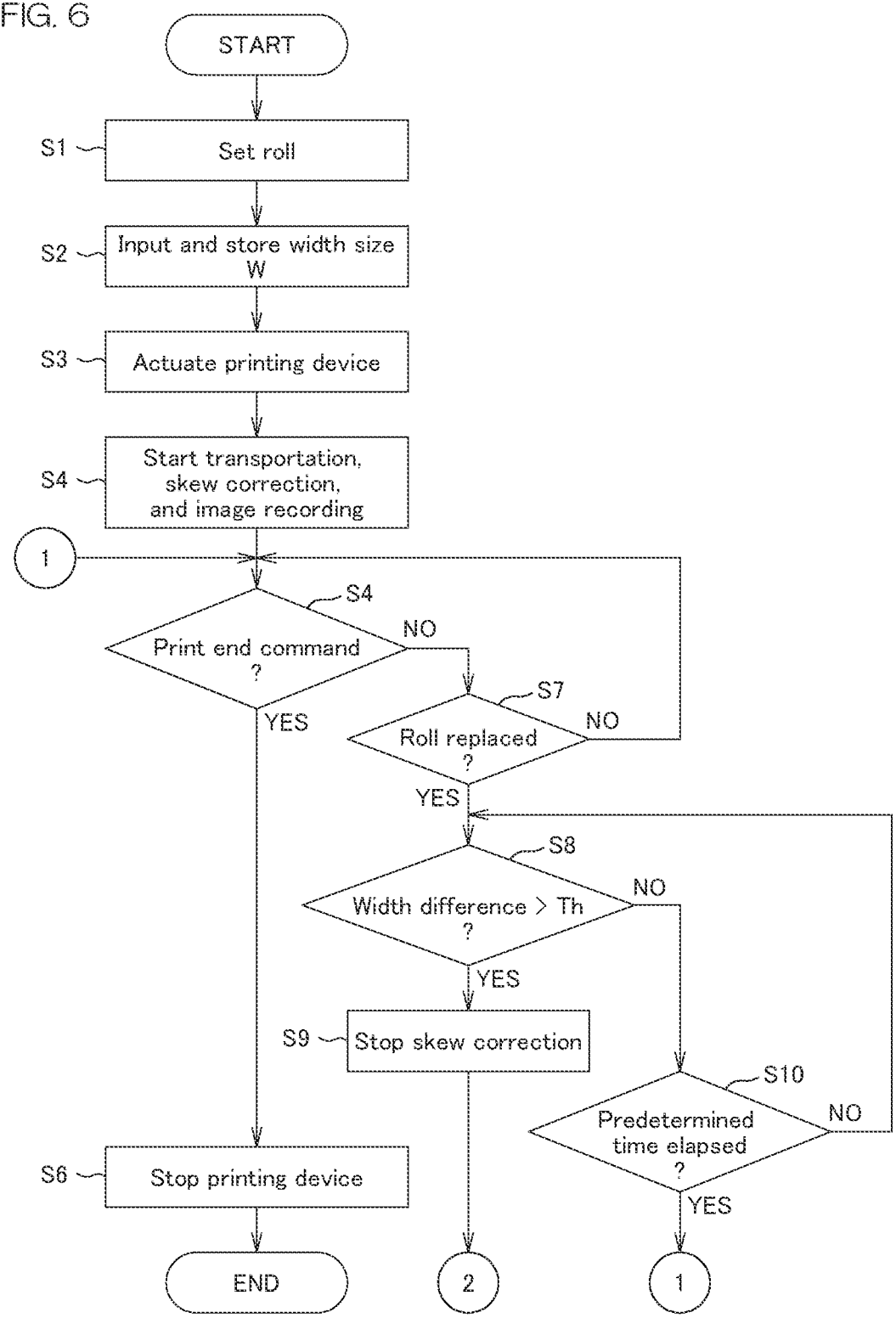

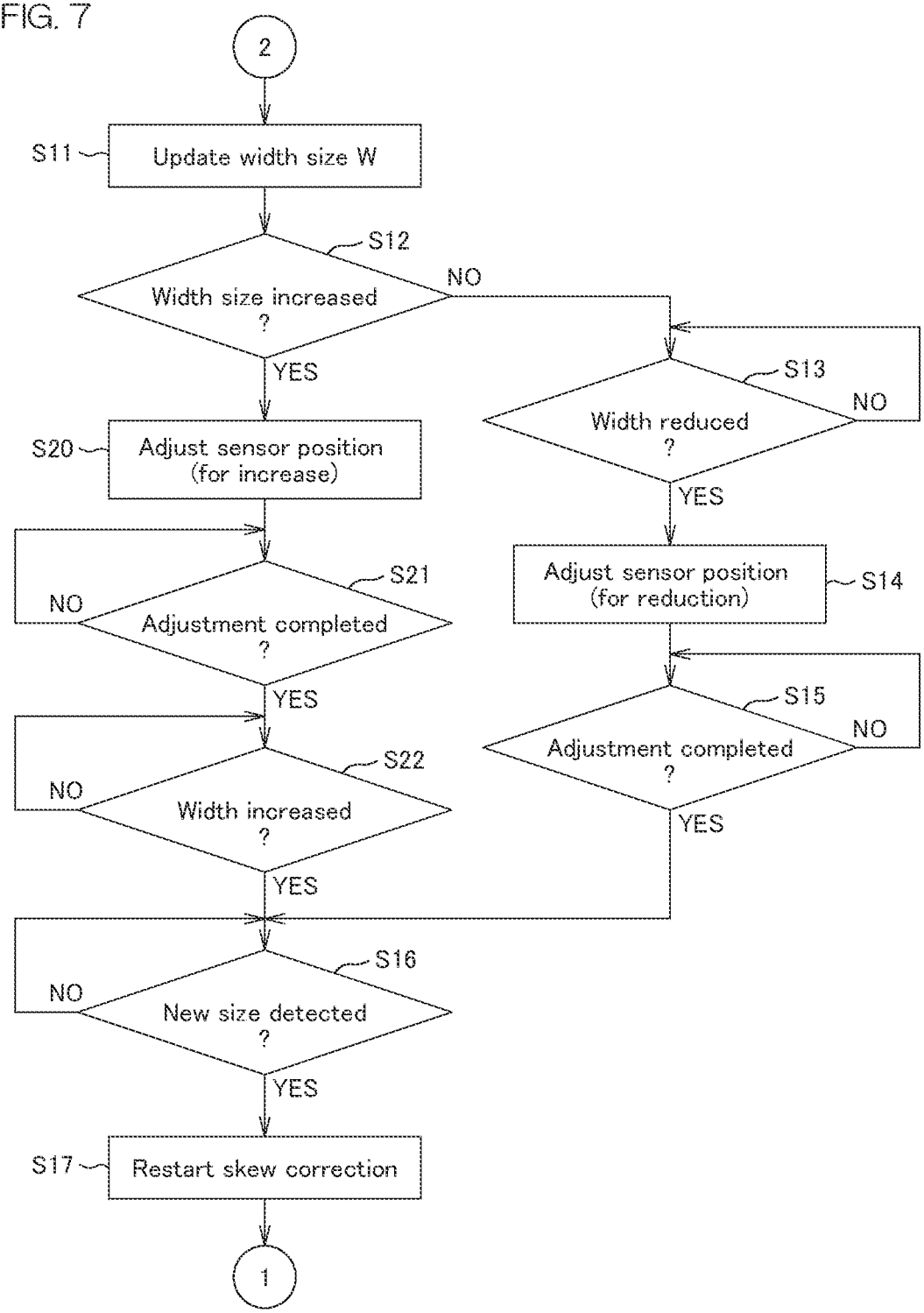

PRINTING DEVICE

RELATED APPLICATION

This application is the U.S. National Phase under 35 U.S.C. § 371 of International Application No. PCT/JP2020/034964, filed on Sep. 15, 2020, which claims the benefit of Japanese Patent Application No. 2019-177762 filed in the Japan Patent Office on Sep. 27, 2019, the disclosure of which is incorporated herein by reference in its entirety.

TECHNICAL FIELD

The present invention relates to a printing device which performs a printing operation on a web substrate, and particularly to a printing device including a skew correction section which corrects the skew of a substrate.

BACKGROUND ART

A printing device receives a substrate supplied from a substrate unwinder. The substrate unwinder unwinds the substrate from a substrate roll, and feeds the substrate to a main body of the printing device. The printing device often includes a skew correction section which corrects the skew of the substrate (e.g., PTL 1).

RELATED ART DOCUMENT

Patent Document

PTL 1: US Patent Application Publication No. 2018/273330

SUMMARY OF INVENTION

Problem to be Solved by the Invention

The width size of the substrate transported through the printing device is sometimes changed during a printing operation sequence. In this case, an operator temporarily stops the transportation of the substrate in order to prevent the breakage of the substrate in the skew correction section, before a width size-changed portion of the substrate reaches the skew correction section. The operator manually transports the substrate to pass the width size-changed portion of the substrate through the skew correction section, and then restarts the automatic transportation of the substrate.

In this case, a downtime occurs in the printing device, problematically making it impossible to sufficiently use the capability of the printing device.

In view of the foregoing, an embodiment of the present invention provides a printing device capable of continuously transporting a substrate even if a substrate having a different width size is transported to a skew correction section of the printing device.

Solution to Problem

To solve the aforementioned problem, the embodiment of the present invention has the following features:

The embodiment of the present invention provides a printing device, which includes: a substrate feed-out section which feeds out a web substrate; a substrate transport section which transports the substrate fed out of the substrate feed-out section in a transport direction; a storage which stores the width size of the substrate transported by the substrate transport section; a skew correction section including a skew sensor which detects the skew of the substrate, and adapted to correct the skew of the substrate with reference to an output of the skew sensor and the substrate width size stored in the storage; an image recording section which performs an image recording operation on the substrate; a first sensor which detects a width size-changed portion of the substrate upstream of the skew correction section with respect to the transport direction; and a controller. Upon the detection of the width size-changed portion of the substrate by the first sensor, the controller performs a skew correction stopping control operation to stop the substrate skew correction being performed by the skew correction section while causing the substrate transport section to continuously transport the substrate. After determination that the width size-changed portion of the substrate reaches a reference position downstream of the skew correction section, the controller cancels the skew correction stopping control operation, and performs a skew correction restarting control operation to cause the skew correction section to restart the substrate skew correction.

In the printing device, the controller stops the skew correction being performed by the skew correction section when the first sensor detects a change in the width size of the substrate. When a substrate having a different width size is transported to the skew correction section, therefore, the skew correction section is automatically stopped, and the substrate transportation is continued. This makes it possible to continue the substrate transportation without breaking the substrate in the skew correction section.

In an embodiment of the present invention, the controller performs an update control operation to update the substrate width size stored in the storage based on an output of the first sensor or the skew sensor.

The printing device makes it possible to automatically update the substrate width size.

In an embodiment of the present invention, the controller determines that the width size-changed portion of the substrate reaches the reference position, based on a time elapsed from the detection of the width size-changed portion by the first sensor and the transport speed of the substrate transport section or based on a distance for which the substrate is transported by the substrate transport section after the detection of the width size-changed portion by the first sensor.

The printing device makes it possible to easily determine that the width size-changed portion of the substrate reaches the reference position.

In an embodiment of the present invention, the substrate transport section includes a roller which transports the substrate, and an encoder which detects the transport speed of the roller. In this case, the controller may determine that the width size-changed portion of the substrate reaches the reference position, based on the time elapsed from the detection of the width size-changed portion by the first sensor and an output signal of the encoder.

The printing device makes it possible to easily determine that the width size-changed portion of the substrate reaches the reference position.

In an embodiment of the present invention, the substrate transport section includes a roller which transports the substrate, and a transport motor which rotates the roller according to command pulses. In this case, the controller may determine that the width size-changed portion of the substrate reaches the reference position, based on the number of the command pulses generated after the detection of the width size-changed portion by the first sensor.

The printing device makes it possible to easily determine that the width size-changed portion of the substrate reaches the reference position.

In an embodiment of the present invention, the printing device includes a second sensor provided at the reference position and adapted to detect the width size of the substrate. In this case, the controller may determine that the width size-changed portion of the substrate reaches the reference position, based on an output of the second sensor.

In the printing device, the controller can determine that the width size-changed portion of the substrate reaches the reference position, based on the output of the second sensor. This makes it possible to reliably determine that the width size-changed portion of the substrate reaches the reference position.

In an embodiment of the present invention, the controller performs the update control operation to update the substrate width size stored in the storage based on the output of the second sensor.

The printing device makes it possible to automatically update the substrate width size.

In an embodiment of the present invention, the image recording section includes a recording head which ejects ink droplets toward the substrate to form an image.

According to the printing device, the present invention is applicable to a printing device of a type adapted to eject ink droplets for the image formation.

The foregoing and other objects, features, and effects of the present invention will become more apparent from the following description of embodiments with reference to the attached drawings.

BRIEF DESCRIPTION OF DRAWINGS

FIG. 6 is a flowchart for describing an operation sequence to be performed by the printing device 1.

FIG. 7 is a flowchart for describing an operation sequence to be performed by the printing device 1.

DESCRIPTION OF EMBODIMENTS

An embodiment of the present invention will hereinafter be described with reference to the drawings. In the following description, a direction in which a print sheet 9 is transported is referred to as "transport direction" and a direction perpendicular to the transport direction is referred to as "widthwise direction."

<1. Construction of Printing Device>

Figure 1:
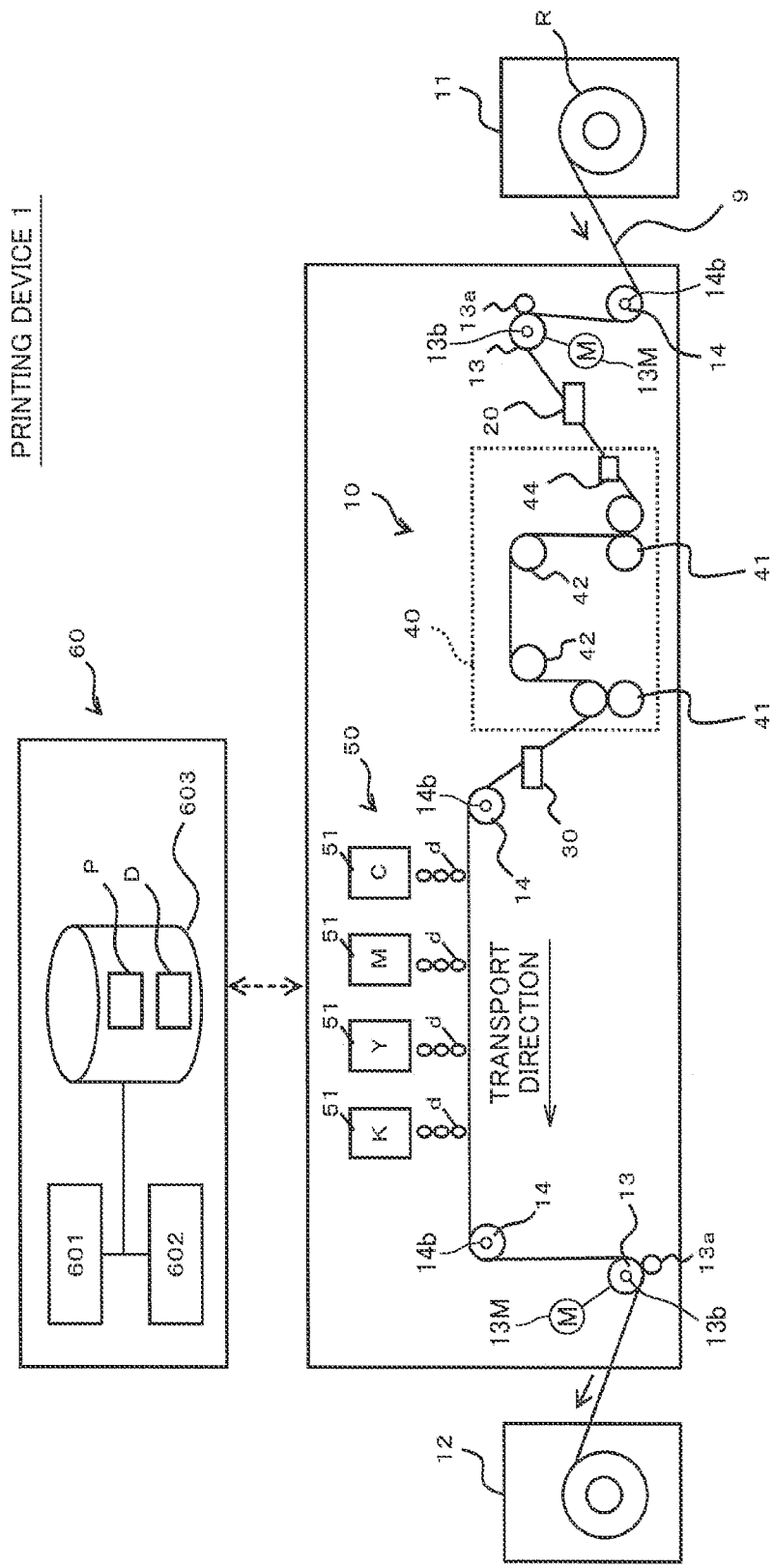
FIG. 1 is a schematic construction diagram of a printing device 1 according to an embodiment.

FIG. 1 is a schematic construction diagram of a printing device 1 according to an embodiment of the present invention. The printing device 1 is adapted to record an image on a surface of the print sheet 9 (web substrate) in an inkjet manner while transporting the print sheet 9 in a longitudinal direction. As shown in FIG. 1, the printing device 1 includes a transport mechanism 10, a first edge sensor 20, a second edge sensor 30, a skew correction section 40, an image recording section 50, and a controller 60.

The transport mechanism 10 is adapted to transport the print sheet 9 along a predetermined transport path. In this embodiment, the transport mechanism 10 has an unwinding section 11, a winding section 12, and a plurality of transport rollers 13, 14. Motors (not shown) each serving as a power source are respectively connected to the unwinding section 11 and the winding section 12. The unwinding section 11 is adapted to retain a roll of the print sheet 9 (print sheet roll R), and is capable of retaining a print sheet roll R being currently used and a spare print sheet roll R different from the print sheet roll R in current use. The unwinding section 11 has an automatic splicing function. That is, when the unwinding of the print sheet 9 from the print sheet roll R in current use is finished, the unwinding section 11 automatically splices the leading end of the print sheet 9 unwound from the spare print sheet roll R to the trailing end of the previous print sheet 9 with a tape or the like (paper splicing). This makes it possible to continuously transport the print sheets 9. There are various print sheets having different widths and, therefore, the width size of the print sheet 9 is sometimes significantly changed when the print sheet roll R is replaced.

Alternatively, the print sheet roll R may be manually replaced. In this case, there is also a possibility that the width size of the print sheet 9 is significantly changed.

The transport rollers 13, 14 include driving rollers 13 which are each spontaneously rotated by the power of a transport motor 13M, and driven rollers 14 which are each rotated according to the movement of the print sheet 9 without connection to the motor. The driving rollers 13 each cooperate with a nip roller 13a to nip the print sheet 9 and transport the print sheet 9.

The transport rollers 13, 14 define the transport path along which the print sheet 9 is transported. The transport rollers 13, 14 are each rotatable about a horizontal axis to guide the print sheet 9 unwound from the unwinding section 11 downstream along the transport path. With the print sheet 9 in contact with the transport rollers 13, 14, a tension is applied to the print sheet 9.

When the controller 60 drives the motors respectively connected to the unwinding section 11, the winding section 12 and the driving rollers 13, the unwinding section 11, the winding section 12 and the driving rollers 13 are respectively rotated. Thus, the print sheet 9 is unwound from the unwinding section 11, and transported to the winding section 12 via the transport rollers 13, 14.

The first edge sensor 20 is disposed downstream of the unwinding section 11 and upstream of the skew correction section 40 (to be described later) with respect to the transport direction, and is adapted to detect the width size of the print sheet 9 transported along the transport path.

Figure 2:
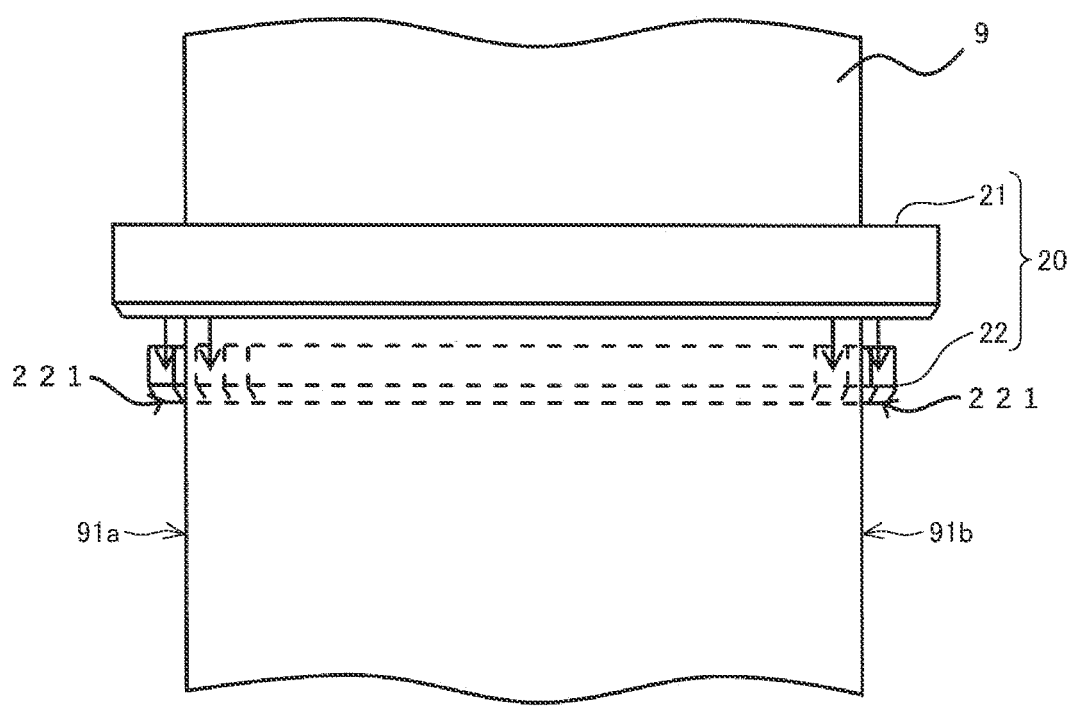
FIG. 2 is a diagram schematically showing the structure of a first edge sensor 20.

FIG. 2 is a diagram schematically showing the structure of the first edge sensor 20. As shown in FIG. 2, the first edge sensor 20 has a light projector 21 disposed above edges 91a, 91b of the print sheet 9, and a line sensor 22 disposed below the edges 91a, 91b. The light projector 21 emits parallel light downward. The line sensor 22 has a plurality of light receiving elements 221 disposed in adjacent relation to the widthwise opposite edges 91a and 91b. The light receiving elements 221 are arranged in the widthwise direction. As shown in FIG. 2, parts of the light emitted from the light projector 21 outward of the edges 91a, 91b of the print sheet 9 are incident on some of the light receiving elements 221, which in turn detect the light. On the other hand, a part of the light emitted from the light projector 21 inward of the edges 91a, 91b of the print sheet 9 is blocked by the print sheet 9 and, therefore, is detected by none of the light receiving elements 221. The first edge sensor 20 detects the widthwise positions of the widthwise opposite edges 91a and 91b of the print sheet 9 based on the presence/absence of the light detection by the light receiving elements 221, and detects the width size of the print sheet 9 based on the detected positions of the edges 91a and 91b.

When the roll is replaced, as described above, the width size of the print sheet 9 is liable to be significantly changed. At this time, the edges 91a, 91b of the print sheet 9 are liable to be greatly shifted in the widthwise direction as compared with an ordinary skew. For detection of such a great shift in the widthwise direction, the light projector 21 and the line sensor 22 of the first edge sensor each have a sufficient length as measured in the widthwise direction.

The first edge sensor 20 may be a camera capable of photographing the entire width of the print sheet 9.

As shown in FIG. 1, the second edge sensor 30 is disposed downstream of the skew correction section 40 with respect to the transport path and upstream of the image recording section 50 (to be described later) with respect to the transport path, and is adapted to detect the widthwise edges of the print sheet 9 transported through the transport path. The second edge sensor 30 has the same structure as the first edge sensor 20 and, therefore, detailed description will be omitted. Like the first edge sensor 20, the second edge sensor 30 has a sufficient length as measured in the widthwise direction. The second edge sensor 30 is disposed at a position (reference position) downstream of the skew correction section 40 to be described later.

The skew correction section 40 has a mechanism for correcting the widthwise position of the print sheet 9. The skew correction section 40 is disposed downstream of the first edge sensor 20 with respect to the transport path and upstream of the second edge sensor 30 with respect to the transport path.

Figure 3:
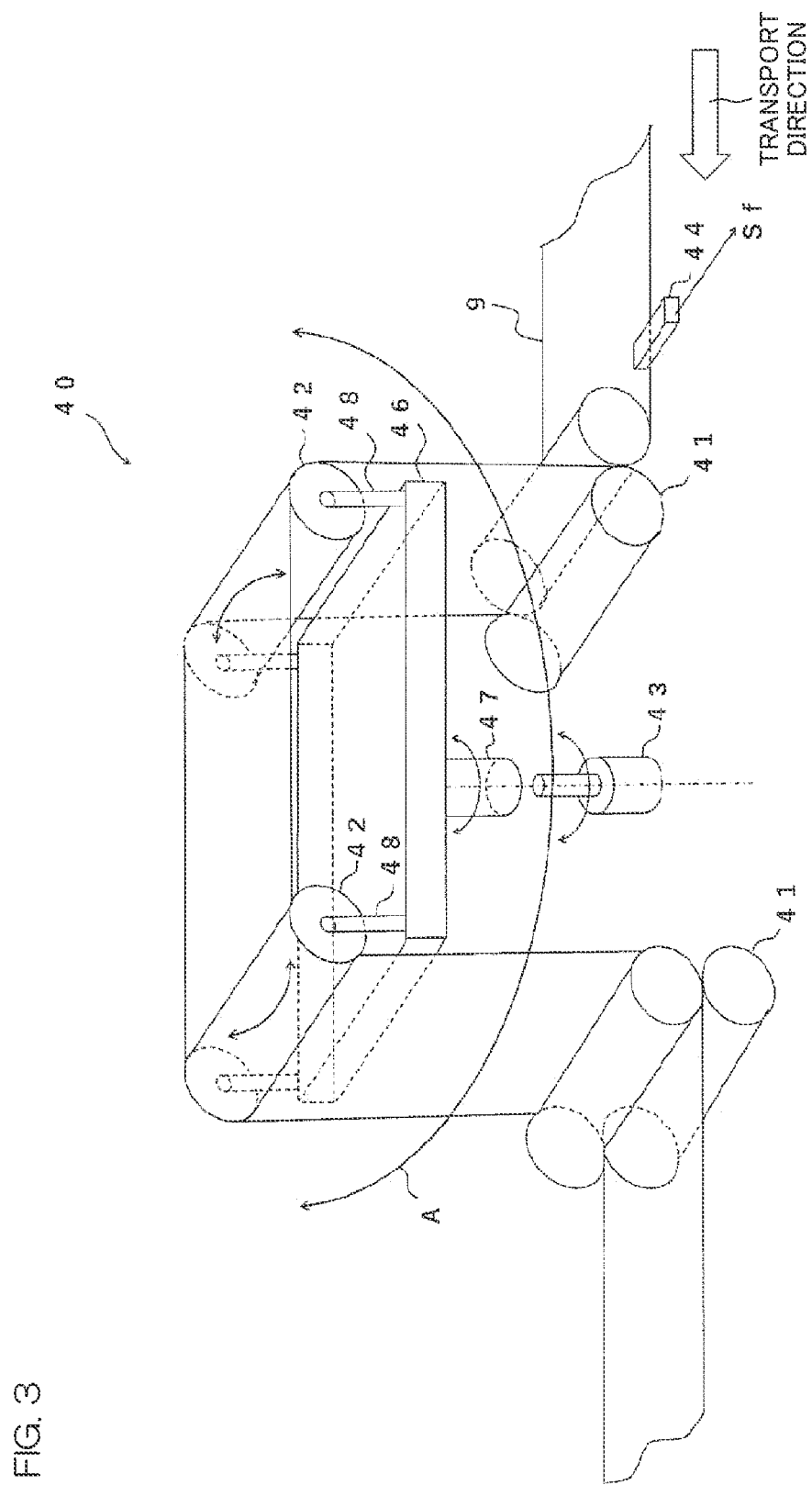
FIG. 3 is a diagram illustrating a skew correction section 40 by way of example.

FIG. 3 is a diagram illustrating the skew correction section 40 by way of example. The skew correction section 40 shown in FIG. 3 has a pair of guide rollers 42, a movement mechanism 43, a skew sensor 44, a box frame 46, a rotation shaft 47, and holding members 48 which are disposed between a pair of stationary rollers 41.

The pair of stationary rollers 41 and the pair of guide rollers 42 are rotated in contact with the print sheet 9 to guide the print sheet 9 downstream.

The pair of guide rollers 42 are rotatably held by the holding members 48. The holding members 48 are fixed to an upper surface of the box frame 46. The rotation shaft 47 projects from a bottom surface of the box frame 46. The rotation shaft 47 is connected to the movement mechanism 43. The movement mechanism 43 includes, for example, an actuator, and is controlled to be actuated by a skew controller 63 to be described later. When the movement mechanism 43 is actuated, the box frame 46 is pivoted about the rotation shaft 47 in arrow directions A together with the pair of guide rollers 42. Thus, the skew correction section 40 is capable of shifting the print sheet 9 in the widthwise direction.

The skew sensor 44 detects the widthwise position of an edge 91 (one of the edges 91a and 91b) of the print sheet 9 upstream of an upstream one of the stationary rollers 41, and an edge detection signal Sf indicating the edge position of the print sheet 9 detected at the position of the skew sensor 44 is outputted to the skew controller 63.

Figure 4:
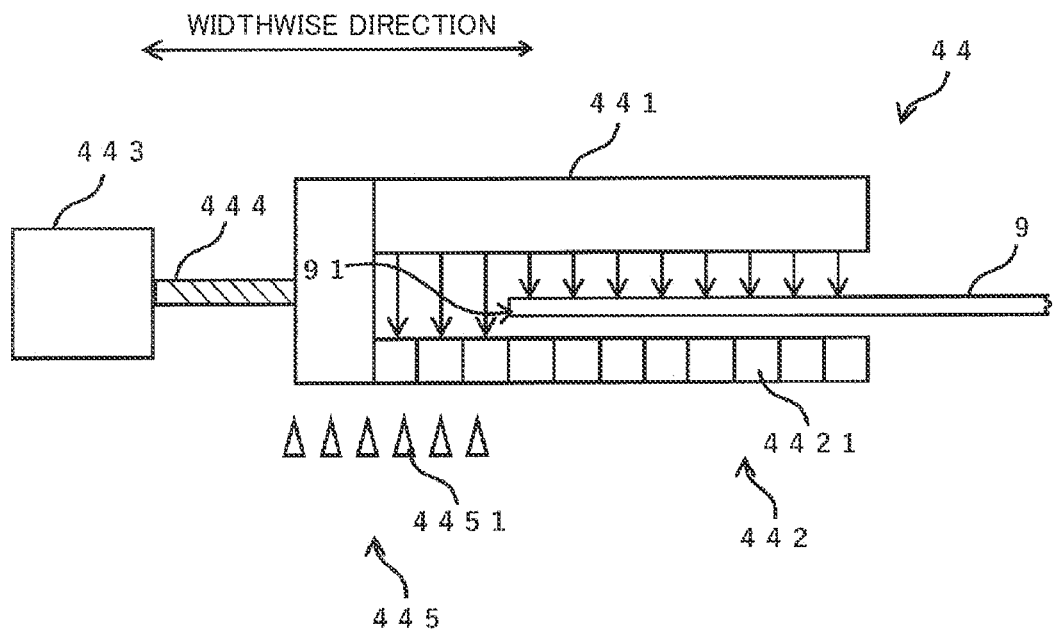
FIG. 4 is a diagram schematically showing the structure of a skew sensor 44.

FIG. 4 is a diagram schematically showing the structure of the skew sensor 44. The skew sensor 44 has a light projector 441 disposed above the edge 91 of the print sheet 9, and a line sensor 442 disposed below the edge 91. The light projector 441 emits parallel light downward. The line sensor 442 has a plurality of light receiving elements 4421 arranged in the widthwise direction.

Unlike the first and second edge sensors 20, 30, the skew sensor 44 includes a sensor movement mechanism 443 which adjusts the setting position of a main body (including the light projector 441 and the line sensor 442) of the skew sensor 44 with respect to the widthwise direction. The sensor movement mechanism 443 includes, for example, a motor. The sensor movement mechanism 443 is adapted, for example, to move an adjustment shaft 444 connected to the rotation shaft of the motor in the widthwise direction to thereby adjust the widthwise position of the main body of the skew sensor 44 connected to the adjustment shaft 444.

The skew sensor 44 further includes a position check sensor 445 which checks the position of the skew sensor 44 after the adjustment of the position. The position check sensor 445 includes a plurality of detection elements 4451 disposed at different widthwise positions. The skew controller 63 is capable of checking the widthwise position of the main body of the skew sensor 44 based on outputs of the detection elements 4451 (sensor position detection signal Sh).

Where the sensor movement mechanism 443 includes a pulse motor, the skew controller 63 may check the widthwise position of the main body of the skew sensor 44 based on the number of command pulses outputted to the sensor movement mechanism 443.

If the skew sensor 44 has a sufficient widthwise size, like the first and second edge sensors 20, 30, the sensor movement mechanism 443 may be obviated.

The structure of the skew correction section is not limited to that shown in FIG. 3. The skew correction section may be adapted to shift the print sheet 9 in the widthwise direction, for example, by tilting the guide rollers.

Referring back to FIG. 1, the image recording section 50 has a mechanism which ejects ink droplets d toward the print sheet 9 transported by the transport mechanism 10. In FIG. 1, the image recording section 50 is disposed downstream of the second edge sensor 30 with respect to the transport path and upstream of the winding section 12 with respect to the transport path by way of example.

In this embodiment, the image recording section 50 has four recording heads 51. The four recording heads 51 are arranged in spaced relation in the transport direction above the transport path of the print sheet 9. The recording heads 51 each have a plurality of ejection ports arranged parallel to the width of the print sheet 9. The four recording heads 51 are respectively adapted to eject ink droplets of cyan (C), ink droplets of magenta (M), ink droplets of yellow (Y), and ink droplets of black (K) (ink droplets of color components of a color image) from the ejection ports thereof toward the upper surface of the print sheet 9. Thus, the color image is recorded on the upper surface of the print sheet 9.

In this embodiment, the image recording section 50 is of a so-called single-pass system. That is, the four recording heads 51 are not reciprocally moved in the widthwise direction. The image recording section 50 is adapted to record the image on the upper surface of the print sheet 9 by ejecting the ink droplets from the respective recording heads 51 while passing the print sheet 9 only once below the respective recording heads 51.

The controller 60 controls the operations of the respective members of the printing device 1. As conceptually shown in FIG. 1, the controller 60 is constituted by a computer including an arithmetic processing unit 601 (processor) such as CPU, a memory 602 such as RAM, and a storage 603 such as hard disk drive.

Figure 5:
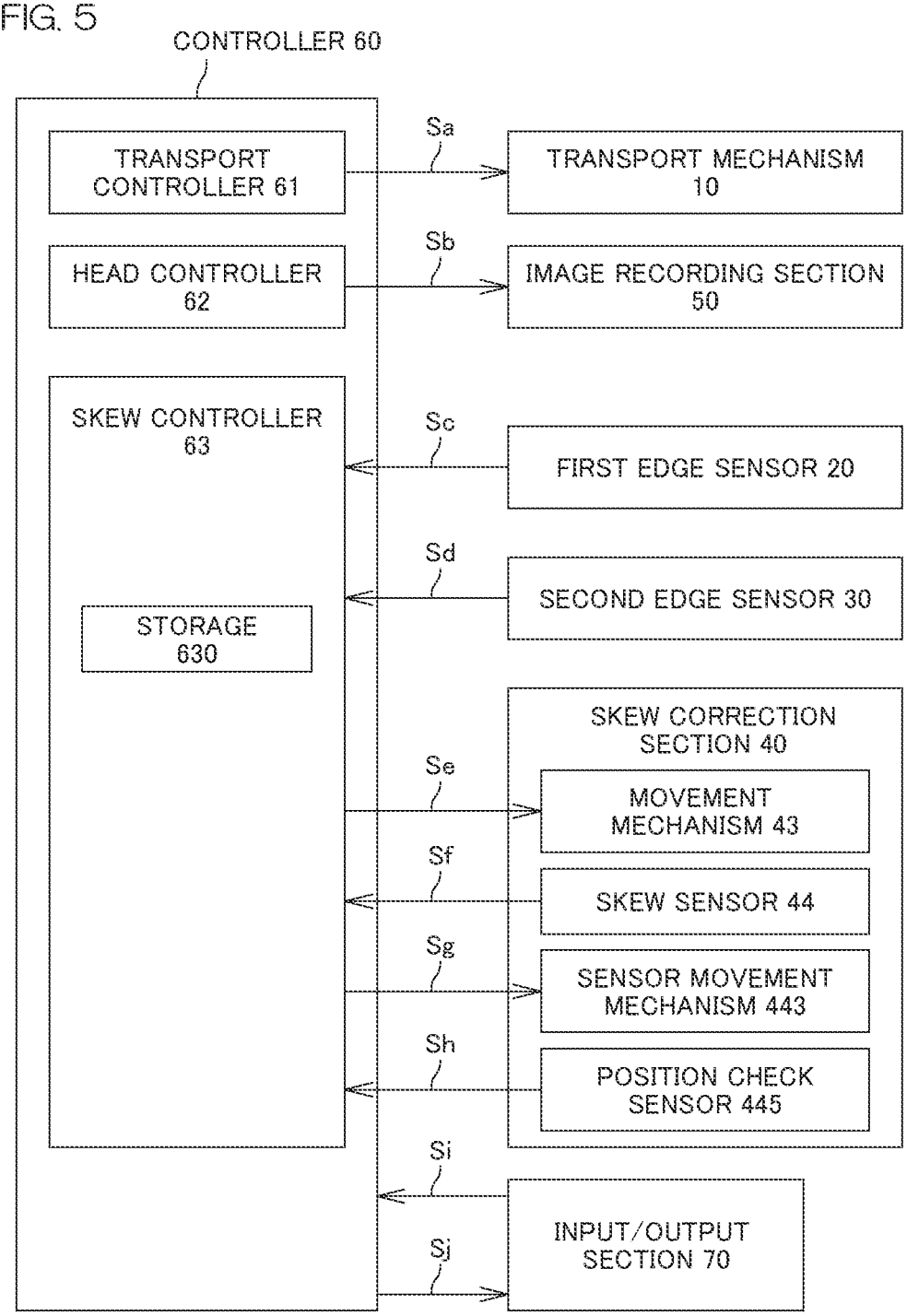
FIG. 5 is a block diagram showing connection between a controller 60 and respective members of the printing device 1.

FIG. 5 is a block diagram showing connection between the controller 60 and the respective members of the printing device 1. As shown in FIG. 5, the controller 60 is connected to the transport mechanism 10, the first edge sensor 20, the second edge sensor 30, the skew correction section 40 and the image recording section 50 described above, and to an input/output section 70 for communication with these members. The input/output section 70 functions as an interface with the operator.

The controller 60 temporarily reads out a computer program P and data D stored in the storage 603 into the memory 602. The arithmetic processing unit 601 performs an arithmetic processing operation based on the computer program P and the data D. In this manner, the controller 60 controls the operations of the respective members of the printing device 1. Thus, a printing operation and a skew correcting operation to be described later are performed in the printing device 1.

As conceptually shown in FIG. 5, the controller 60 has a transport controller 61, a head controller 62 and the skew controller 63. The computer serving as the controller 60 operates according to the computer program P to achieve the functions of these members.

The transport controller 61 controls the transport mechanism 10 to transport the print sheet 9. Specifically, the transport controller 61 outputs drive command signals Sa to the motors respectively connected to the unwinding section 11, the winding section 12 and the driving rollers 13. Thus, the transport controller 61 drives the motors at rotation speeds specified for the respective motors. With the motors thus driven, the print sheet 9 is transported along the transport path by the rotation of the driving rollers 13, the unwinding section 11 and the winding section 12.

The head controller 62 controls the four recording heads 51 to eject the ink droplets from the respective recording heads 51. The head controller 62 outputs ejection command signals Sb to the four recording heads 51 based on inputted image data. The ejection command signals Sb each include information indicating a nozzle from which ink droplets are to be ejected, an ink droplet size and an ink droplet ejection timing. The recording heads 51 each eject ink droplets having a specified size from a specified nozzle at a timing specified by the ejection command signals Sb. Thus, the image corresponding to the image data is formed on the upper surface of the print sheet 9.

The first edge sensor 20 detects the widthwise opposite edges 91a and 91b of the print sheet 9, and outputs a first size signal Sc indicating the width size of the print sheet 9 at the position of the first edge sensor 20 to the skew controller 63 of the controller 60.

Similarly, the second edge sensor 30 detects the widthwise opposite edges 91a and 91b of the print sheet 9, and outputs a second size signal Sd indicating the width size of the print sheet 9 at the position of the second edge sensor 30 to the skew controller 63 of the controller 60.

The skew controller 63 controls the operation of the skew correction section 40. The skew controller 63 has a storage 630. The width size W of the print sheet roll R in current use is preliminarily stored in the storage 630. With reference to the edge detection signal Sf outputted from the skew sensor 44, the skew controller 63 outputs a control signal Se to the movement mechanism 43 so that the edge position of the print sheet 9 being transported coincides with the edge position corresponding to the width size W. Upon reception of the control signal Se, the movement mechanism 43 swivels the guide rollers 42. Thus, the widthwise position of the print sheet 9 is corrected. A predetermined threshold value Th to be described later is also stored in the storage 630. The magnitude of the threshold value Th is determined based on a skew amount possibly occurring during the ordinary transportation of the print sheet 9. For example, the threshold value Th is set to a value with which a skew amount uncorrectable by the skew correction section 40 can be detected.

The skew controller 63 is connected to the first edge sensor 20 and the second edge sensor 30. With reference to the first size signal Sc and the second size signal Sd respectively outputted from the first edge sensor 20 and the second edge sensor 30, and the width size W and the threshold value Th stored in the storage 630, the skew controller 63 can determine that a change in the width size of the print sheet 9 falls outside the ordinary skew range.

Further, the input/output section 70 is connected to the controller 60. The operator can apply a command signal Si via the input/output section 70 for operating the printing device 1. For example, the operator can store the width size W of the print sheet roll R set in the unwinding section 11 to be transported by the transport mechanism 10 in the storage 630 of the controller 60 (skew controller 63) via the input/output section 70.

The controller 60 outputs a state signal Sj to the input/output section 70 to cause the input/output section 70 to display the state of the printing device 1 to provide information to the user. For example, the controller 60 can provide necessary information to the operator by causing the input/output section 70 to give an alarm of the emergency stop of the printing device 1 and to display a reason for the emergency stop.

<2. Skew Correction>

Next, the skew correction in the printing device 1 will be described in greater detail with reference to FIGS. 5, 6, 7, and 8A to 8E. FIGS. 6 and 7 are flowcharts for describing an operation sequence to be performed by the printing device 1. FIGS. 8A to 8E are schematic top views of the transport path respectively showing transitional states observed over time when print sheets 9 having different width sizes are transported through the transport path after the print sheet roll R is replaced.

First, the operator sets a print sheet roll R in the unwinding section 11 (Step S1).

Then, the operator inputs the width size W of the set print sheet roll R to the input/output section 70 (Step S2). The inputted width size W is stored in the storage 630 of the skew controller 63.

Subsequently, the operator sends the command signal Si to the controller 60 via the input/output section 70 to actuate the printing device 1 (Step S3).

The controller 60 starts the transportation of the print sheet 9, the skew correction, and the image recording (Step S4).

That is, the transport controller 61 of the controller 60 sends the drive command signals Sa to the transport mechanism 10 to start the transportation of the print sheet 9 by rotating the driving rollers 13 of the transport mechanism 10.

The skew controller 63 of the controller 60 sends the control signal Se to the skew correction section 40 with reference to the edge detection signal Sf to control the movement mechanism 43 so that the edge position of the print sheet 9 being transported can be maintained at an edge position corresponding the width size W inputted in Step S2.

When the transportation speed of the print sheet 9 reaches a predetermined speed, the head controller 62 of the controller 60 sends the ejection command signals Sb to the image recording section 50 to cause the image recording section 50 to eject the ink droplets d from the respective recording heads 51 to thereby form a color image on the upper surface of the print sheet 9.

The controller 60 determines whether a print end command is given from the input/output section 70 (Step S5). If the print end command is given, the controller 60 stops the operation of the printing device 1 (Step S6). If the print end command is not given, the process goes to Step S7 to monitor whether the print sheet roll R is replaced in the unwinding section 11. When the operator replaces the print sheet roll R, the operator inputs the replacement of the print sheet roll R to the input/output section 70. Therefore, the controller 60 can detect, with reference to the command signal Si applied from the input/output section 70, that the print sheet roll R is replaced in the unwinding section 11.

If the determination result in Step S7 is NO, the process returns to Step S5. If the determination result in Step S7 is YES, the process goes to Step S8. In Step S8, it is determined whether or not a difference between the width size W of the print sheet 9 detected by the first edge sensor 20 and the width size W stored in the storage 630 exceeds the threshold value Th, with reference to the first size signal Sc outputted by the first edge sensor 20. If the determination result in Step S8 is YES, the process goes to Step S9 to perform a skew correction stopping control operation to be described later. If the determination result in Step S8 is NO, on the other hand, the process goes to Step S10 to determine whether or not a predetermined time is elapsed from Step S7.

When the print sheet roll R is replaced, a print sheet 9 having a different width size W is often transported toward the skew correction section 40 along the transport path.

FIGS. 8A to 8E are diagrams for describing the change in the width size W of the print sheet 9 with time. In FIGS. 8A to 8E, print sheets 9 are schematically illustrated as seen from above and, in addition, the edge detection positions at which the edges of the print sheets 9 are detected by the first edge sensor 20, the skew sensor and the second edge sensor 30 are respectively schematically shown by arrows.

The trailing end of a print sheet 9a unwound from a print sheet roll R before the replacement is spliced to the leading end of a print sheet 9b unwound from a print sheet roll R after the replacement with the use of a tape T. A width size-changed portion of the print sheet 9, i.e., a spliced portion of the print sheets 9a and 9b, is herein referred to as connection portion C. In FIGS. 8A to 8E, the width size Wa of the print sheet 9a before the replacement is greater than the width size Wb of the print sheet 9b after the replacement by way of example. It is herein assumed that a difference between the width size Wb of the print sheet 9b after the replacement and the width size W stored in the storage 630 is greater than the threshold value Th described above.

Figure 8A:
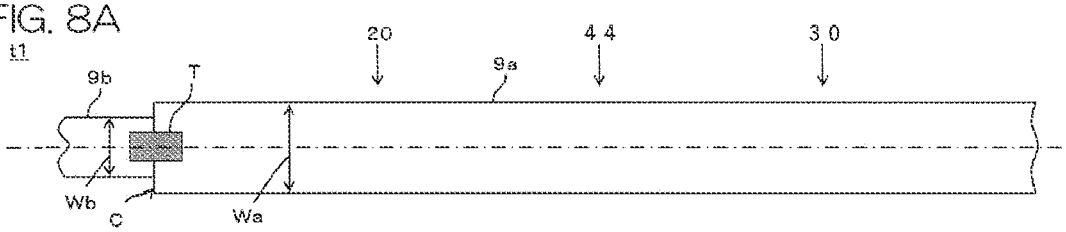
FIGS. 8A to 8E are state transition diagrams for describing a change in the width size of a print sheet 9 when a print sheet roll is replaced.

In FIG. 8A, the connection portion C is located upstream of the first edge sensor 20 with respect to the transport direction. This state occurs at a time t1.

Figure 8B:
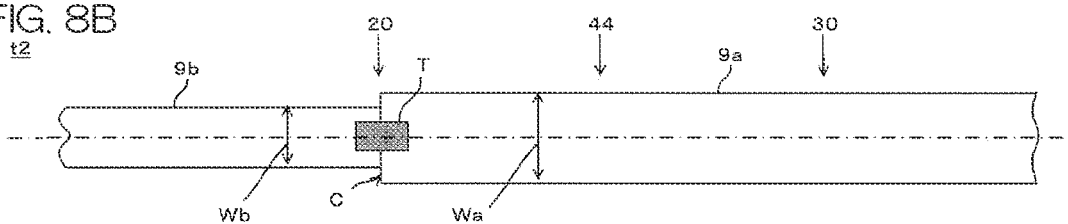

With the print sheet 9 further transported, the connection portion C reaches the first edge sensor 20. This state is shown in FIG. 8B. This state occurs at a time t2. With this state reached, the first edge sensor 20 detects the width size Wb of the print sheet 9b after the replacement. In FIGS. 8A to 8E, the difference between the width size Wb of the print sheet 9b detected by the first edge sensor 20 and the width size W stored in the storage 630 is greater than the threshold value Th by way of example. Therefore, the determination result in Step S8 of the flowchart is YES, and the process goes to Step S9. Then, the controller 60 performs the skew correction stopping control operation and a skew correction restarting control operation to be described later. Thus, the first edge sensor 20 can detect the connection portion C (width size-changed portion) of the print sheet 9.

If the determination result in Step S8 is NO and the determination result in Step S10 is YES, the controller 60 determines that the width size is not changed when the print sheet roll R is replaced, and the process returns to Step S5 without performing the skew correction stopping control operation and the skew correction restarting control operation.

When the process goes from Step S8 to Step S9, the skew controller 63 performs the skew correction stopping control operation to stop the skew correction being performed by the skew correction section 40. That is, the skew controller 63 stops the operation of the movement mechanism 43 of the skew correction section 40 irrespective of the width size W of the print sheet 9 detected by the skew sensor 44, while the print sheet 9 is continuously transported.

Referring to FIG. 7, the skew controller 63 updates the width size W stored in the storage 630 based on the first size signal Sc outputted by the first edge sensor 20 (Step S11). In FIGS. 8A to 8E, the width size Wa of the print sheet 9a before the replacement is updated to the width size Wb of the print sheet 9b after the replacement by way of example.

In Step S12, the process is branched according to whether the determination result based on the output of the first edge sensor 20 is that the width size W is increased (to a greater width size) or that the width size W is reduced (to a smaller width size).

If the determination result is that the width size is reduced (NO in Step S12), the process goes to Step S13.

Figure 8C:
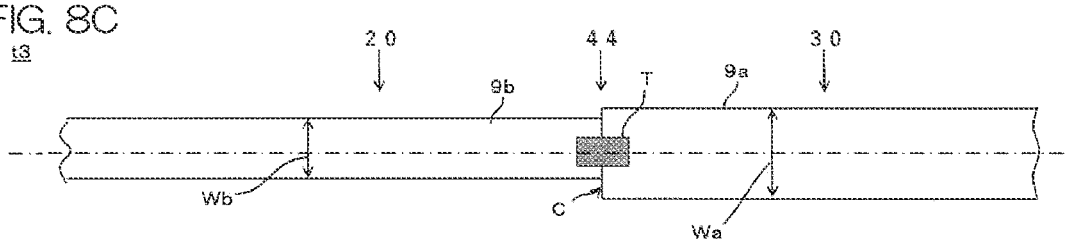

In Step S13, it is determined whether or not the width size W is reduced, based on the output of the skew sensor 44. With the print sheet 9 further transported, the connection portion C reaches the skew sensor 44. In Step S13, the skew sensor 44 detects the connection portion C and, therefore, it is determined that the width size W is reduced. This state is shown in FIG. 8C. This state occurs at a time t3.

In FIGS. 8A to 8E, the difference between the width size Wb of the print sheet 9b after the replacement and the width size W stored in the storage 630 is great by way of example. In the ordinary skew correction, therefore, the skew correction section 40 would determine that the print sheet 9 be significantly skewed, and would significantly move the movement mechanism 43. The significant movement of the movement mechanism 43 would break the print sheet 9 at the connection portion C. In this embodiment, in contrast, the movement of the movement mechanism 43 is stopped in Step S9, thereby preventing the breakage of the print sheet 9.

Referring back to the flowchart of FIG. 7, if it is determined that the width size W of the print sheet 9 is reduced (YES in Step S13), the process goes to Step S14. In Step S14, the skew controller 63 sends a sensor movement signal Sg to the sensor movement mechanism 443, which in turn moves the main body of the skew sensor 44 to a position that is suitable for the detection of the print sheet 9 having the width size W updated in Step S11.

Subsequently, in Step S15, the skew controller 63 determines whether or not the adjustment of the position of the main body of the skew sensor 44 is completed, based on the sensor position detection signal Sh outputted from the position check sensor 445.

Figure 8D:
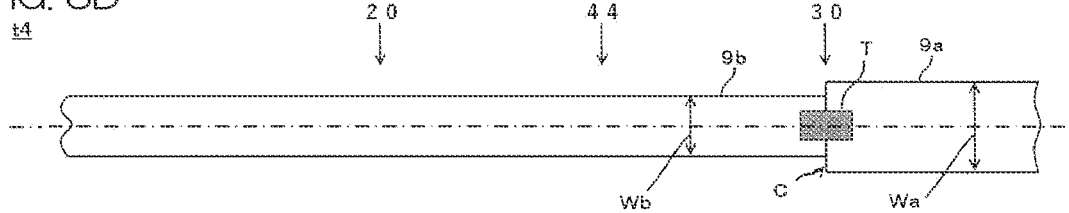
Figure 8E:
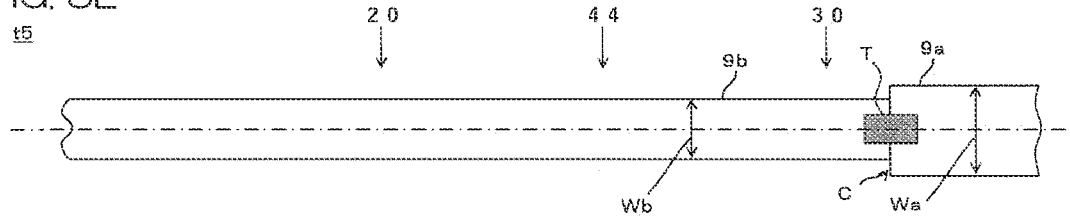

If the determination result in Step S15 is YES, the process goes to Step S16. In Step S16, the skew controller 63 determines, based on the second size signal Sd from the second edge sensor 30, whether or not the second edge sensor 30 detects the edge positions corresponding to the width size W newly updated in Step S11. That is, with the print sheet 9 further transported, the connection portion C reaches the second edge sensor 30, which can detect the edge positions corresponding to the new width size W. This state is shown in FIG. 8D. This state occurs at a time t4.

With the print sheet 9 transported into the state shown in FIG. 8D, the determination result in Step S16 is YES, and the process goes to Step S17. In Step S17, the skew controller 63 performs a skew correction restarting control operation to cause the skew correction section 40 to start the skew correction based on the new width size Wb.

Referring back to Step S12 of the flowchart in FIG. 7, if the determination result in Step S12 is YES, the process goes to Step S20. In Step S20, the skew controller sends the sensor movement signal Sg to the sensor movement mechanism 443, which in turn moves the main body of the skew sensor 44 to a position that is suitable for the detection of the print sheet 9 having the width size W updated in Step S11. Immediately after it is thus determined in Step S12 that the width size of the print sheet 9 is increased, the main body of the skew sensor 44 is moved outward in the widthwise direction. Therefore, the edge of the print sheet 9 is reliably prevented from contacting the skew sensor 44.

Subsequently, in Step S21, the skew controller 63 determines whether the main body of the skew sensor 44 is moved to a desired position, based on the sensor position detection signal Sh from the position check sensor 445.

If the determination result in Step S21 is YES, the process goes to Step S22. In Step S22, the skew controller 63 determines whether the skew sensor 44 can detect the edge position 91 corresponding to the increased width size W, with reference to the edge detection signal Sf from the skew sensor 44.

If the determination result in Step S22 is YES, the process goes to Step S16.

In the printing device 1 according to this embodiment, the skew correction stopping control operation is performed to stop the operation of the skew correction section 40 when a print sheet 9 having a different width size is transported to the skew correction section 40. Further, the skew correction is restarted after the print sheet 9 having the new width size reaches the second edge sensor 30 disposed downstream of the skew correction section 40. Thus, the transportation of the print sheet 9 can be continued without the breakage of the print sheet 9.

Even if the width size of the print sheet 9 is changed due to the replacement of the print sheet roll R during the printing, the width size W stored in the storage 630 can be updated by detecting the new width size during the transportation of the print sheet 9. This eliminates an error which may otherwise occur when the operator inputs a wrong width size W.

Further, the setting position of the skew sensor 44 is automatically adjusted based on the updated width size W of the print sheet 9. Therefore, the position setting in the skew correction section 40 can be achieved without stopping the transportation of the print sheet 9.

<3. Modification>

In the embodiment described above, the edge 91 of the print sheet 9 is detected by the light sensor disposed in adjacent relation to the edge 91 of the print sheet 9. Alternatively, the edge of the print sheet 9 and the width size of the print sheet 9 may be detected by photographing with a camera or the like.

The substrate is not limited to the print sheet. The present invention is applicable to a case in which the substrate is a film substrate.

The printing system is not limited to the inkjet system. For example, the present invention is applicable to a printing device of an electrophotographic system or an offset system.

In the embodiment described above, the width size of the print sheet 9 is updated to a new width size based on the output of the first edge sensor 20. Alternatively, the width size W of the print sheet 9 may be updated based on the output of the second edge sensor 30. The width size W of the print sheet 9 may be updated based on both of the outputs of the first edge sensor 20 and the second edge sensor 30, for example, by averaging the outputs of the first edge sensor 20 and the second edge sensor 30. Alternatively, the width size W of the print sheet 9 may be updated based on the output of the skew sensor 44, or the width size W of the print sheet 9 may be updated based on an input by the operator.

In the embodiment described above, the skew controller 63 determines that the connection portion C reaches the position of the second edge sensor 30, when the second edge sensor 30 actually detects the connection portion C. Alternatively, the skew controller 63 may determine that the connection portion C reaches the position of the second edge sensor 30 (reference position), based on a time elapsed from the detection of the width size-changed portion of the print sheet 9 by the first edge sensor 20 and the transport speed of the transport mechanism 10, or based on a distance for which the print sheet 9 is transported by the transport mechanism 10 after the first edge sensor 20 detects the width size-changed portion of the print sheet 9.

More specifically, an encoder 13b, 14b (see FIG. 1) for detecting the transport speed of a roller, i.e., the transport speed of the transport mechanism 10, may be connected to at least one of the driving rollers 13 or at least one of the driven rollers 14 of the transport mechanism 10. Since a distance between the first edge sensor 20 and the second edge sensor 30 is known, the controller 60 (skew controller 63) can determine that the connection portion C reaches the second edge sensor 30, based on the time elapsed from the detection of the connection portion C by the first edge sensor 20 and the output signal of the encoder 13b, 14b.

The transport motors 13M connected to the driving rollers 13 may each be a transport motor such as a servo motor or a pulse motor which is rotated according to command pulses outputted from the controller 60 (transport controller 61). In this case, the controller 60 can detect the distance for which the print sheet 9 is transported by the transport mechanism 10, by counting the number of the command pulses. Since the distance between the first edge sensor 20 and the second edge sensor 30 is known, the controller 60 (skew controller 63) can determine that the connection portion C reaches the second edge sensor 30, by counting the number of the command pulses after the first edge sensor 20 detects the connection portion C.

Further, where it is possible to determine that the difference between the width size detected by the first edge sensor 20 and the width size of the print sheet 9 stored in the storage 630 is greater than the threshold value Th before the start of the transportation of the print sheet 9, for example, the skew correction stopping control operation may be performed before the start of the transportation.

While the present invention has been described in detail by way of the embodiments thereof, it should be understood that these embodiments are merely illustrative of the technical principles of the present invention but not limitative of the invention. The spirit and scope of the present invention are to be limited only by the appended claims.

DESCRIPTION OF REFERENCE CHARACTERS

1: Printing device
9: Print sheet
10: Transport mechanism
11: Unwinding section
12: Winding section
13: Driving roller
13b: Encoder
13M: Transport motor
14: Driven roller
14b: Encoder
20: First edge sensor
30: Second edge sensor
40: Skew correction section
41: Stationary roller pair
42: Guide roller
43: Movement mechanism
44: Skew sensor
50: Image recording section
51: Recording head
60: Controller
61: Transport controller
62: Head controller
63: Skew controller
70: Input/output section

What is claimed is:

1. A printing device comprising:
a substrate feed-out section which feeds out a web substrate;
a substrate transport section which transports the substrate fed out of the substrate feed-out section in a transport direction;
a storage which stores a width size of the substrate transported by the substrate transport section;
a skew correction section comprising a skew sensor which detects skew of the substrate, and adapted to correct the skew of the substrate with reference to an output of the skew sensor and the substrate width size stored in the storage;
an image recording section which performs an image recording operation on the substrate;
a first sensor which detects a width size-changed portion of the substrate upstream of the skew correction section with respect to the transport direction; and
a controller which, upon the detection of the width size-changed portion of the substrate by the first sensor, performs a skew correction stopping control operation to stop the substrate skew correction being performed by the skew correction section while causing the substrate transport section to continuously transport the substrate and, after determination that the width size-changed portion of the substrate reaches a reference position downstream of the skew correction section, cancels the skew correction stopping control operation, and performs a skew correction restarting control operation to cause the skew correction section to restart the substrate skew correction.

2. The printing device according to claim 1, wherein the controller performs an update control operation to update the substrate width size stored in the storage based on an output of the first sensor or the skew sensor.

3. The printing device according to claim 1, wherein the controller determines that the width size-changed portion of the substrate reaches the reference position, based on a time elapsed from the detection of the width size-changed portion by the first sensor and a transport speed of the substrate transport section or based on a distance for which the substrate is transported by the substrate transport section after the detection of the width size-changed portion by the first sensor.

4. The printing device according to claim 3,
wherein the substrate transport section comprises a roller which transports the substrate, and an encoder which detects a transport speed of the roller,
wherein the controller determines that the width size-changed portion of the substrate reaches the reference position, based on the time elapsed from the detection of the width size-changed portion by the first sensor and an output signal of the encoder.

5. The printing device according to claim 3,
wherein the substrate transport section comprises a roller which transports the substrate, and a transport motor which rotates the roller according to command pulses,
wherein the controller determines that the width size-changed portion of the substrate reaches the reference position, based on a number of the command pulses generated after the detection of the width size-changed portion by the first sensor.

6. The printing device according to claim 1, further comprising a second sensor provided at the reference position and adapted to detect the width size of the substrate,
wherein the controller determines that the width size-changed portion of the substrate reaches the reference position, based on an output of the second sensor.

7. The printing device according to claim 6, wherein the controller performs an update control operation to update the substrate width size stored in the storage based on the output of the second sensor.

8. The printing device according to claim 1, wherein the image recording section comprises a recording head which ejects ink droplets toward the substrate to form an image.

9. The printing device according to claim 1, further comprising an input section configured to be operated by an operator to input the width size of the substrate,
wherein the controller updates the substrate width size stored in the storage according to the input of the width size of the substrate from the input section.

10. A printing device comprising:
a substrate feed-out section which feeds out a web substrate;
a substrate transport section which transports the substrate fed out of the substrate feed-out section in a transport direction;
a skew correction section adapted to correct skew of the substrate;
an image recording section which performs an image recording operation on the substrate;
a controller which receives an input of a signal indicating a width size of the substrate, performs a skew correction stopping control operation, upon change of the width size of the substrate, to stop the substrate skew correction being performed by the skew correction section while causing the substrate transport section to continuously transport the substrate and, after determination that a width size-changed portion of the substrate reaches a reference position downstream of the skew correction section, cancels the skew correction stopping control operation, and performs a skew correction restarting control operation to cause the skew correction section to restart the substrate skew correction.

11. The printing device according to claim 10, wherein the controller performs the skew correction stopping control operation when the change of the width size of the substrate is greater a predetermined threshold, and the controller does not perform the skew correction stopping control operation when the change of the width size of the substrate is not greater than the predetermined threshold.

12. The printing device according to claim 11, further comprising a storage which stores a width size of the substrate transported by the substrate transport section,
   wherein the controller determines whether the change of the width size indicated by the signal with respect to the substrate width size stored in the storage exceeds the predetermined threshold or not.

13. The printing device according to claim 12, wherein the controller performs an update control operation to update the substrate width size stored in the storage when the change of the width size exceeds the predetermined threshold.

* * * * *